United States Patent
Iino et al.

(10) Patent No.: US 10,576,501 B2
(45) Date of Patent: Mar. 3, 2020

(54) VIBRATION GENERATION DEVICE AND ELECTRONIC APPARATUS

(71) Applicant: Seiko Instruments Inc., Chiba-shi, Chiba (JP)

(72) Inventors: Akihiro Iino, Chiba (JP); Masao Kasuga, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 75 days.

(21) Appl. No.: 15/814,922

(22) Filed: Nov. 16, 2017

(65) Prior Publication Data

US 2018/0147605 A1    May 31, 2018

(30) Foreign Application Priority Data

Nov. 28, 2016    (JP) ................... 2016-229839

(51) Int. Cl.
    *B06B 1/16*      (2006.01)
    *B06B 1/04*      (2006.01)
    *H02K 7/065*     (2006.01)
    *G05D 19/02*     (2006.01)
    *H02K 7/06*      (2006.01)

(52) U.S. Cl.
    CPC .............. *B06B 1/166* (2013.01); *B06B 1/045* (2013.01); *B06B 1/16* (2013.01); *G05D 19/02* (2013.01); *H02K 7/063* (2013.01); *H02K 7/065* (2013.01); *B06B 1/164* (2013.01)

(58) Field of Classification Search
    CPC .......... H02K 7/063; H02K 7/065; H02K 1/22; B06B 1/045; B06B 1/166; B06B 1/16; B06B 1/164; G05D 19/02; H04M 19/047

USPC ............................................ 310/81
See application file for complete search history.

(56) References Cited

U.S. PATENT DOCUMENTS

| | | | | |
|---|---|---|---|---|
| 6,534,886 B2* | 3/2003 | An | ............ | H02K 7/063 310/268 |
| 6,636,007 B2* | 10/2003 | Hong | ............ | H02K 7/063 310/254.1 |
| 7,990,002 B2* | 8/2011 | Matsubara | ............ | H02K 7/063 310/193 |
| 8,405,266 B2* | 3/2013 | Nakamura | ............ | H02K 1/2733 29/596 |

(Continued)

FOREIGN PATENT DOCUMENTS

JP    2016-007114 A    1/2016

*Primary Examiner* — Alex W Mok
(74) *Attorney, Agent, or Firm* — Brinks, Gilson & Lione

(57) ABSTRACT

There is provided a vibration generation device superior in responsivity compared to the related art. The vibration generation device includes a stator, a rotor provided to the stator so as to be able to rotate around the central axis, and having a weight having a gravity center at a position shifted from the central axis, and an air resistance reduction part provided to the weight, and reducing the air resistance to the weight when the rotor rotates. The weight is formed to have a semicircular shape viewed from the axial direction, and the air resistance reduction part has an arcuate part adapted to connect an end edge on the upstream side in the rotational direction of the rotor in the outer circumferential surface of the weight and an end edge on the downstream side in the rotational direction to each other so as to form a circular arc shape.

13 Claims, 6 Drawing Sheets

(56) References Cited

U.S. PATENT DOCUMENTS

| | | | |
|---|---|---|---|
| 2002/0047369 A1* | 4/2002 | Yoshida | H02K 7/063 310/81 |
| 2002/0163265 A1* | 11/2002 | Horng | H02K 7/063 310/81 |
| 2002/0167237 A1* | 11/2002 | Horng | H02K 5/225 310/81 |
| 2004/0135444 A1* | 7/2004 | Choi | H02K 5/1677 310/81 |
| 2006/0022535 A1* | 2/2006 | Holman, IV | H02K 7/061 310/81 |
| 2008/0150379 A1* | 6/2008 | Hsiao | H02K 1/145 310/81 |
| 2008/0150380 A1* | 6/2008 | Hsiao | H02K 1/145 310/81 |
| 2009/0267434 A1* | 10/2009 | Park | H02K 7/063 310/81 |
| 2010/0253166 A1* | 10/2010 | Park | H02K 7/063 310/81 |
| 2010/0289357 A1* | 11/2010 | An | H02K 7/063 310/81 |
| 2011/0012459 A1* | 1/2011 | Chang | H02K 7/063 310/113 |
| 2011/0181133 A1* | 7/2011 | Nakamura | H02K 1/2733 310/43 |
| 2011/0266901 A1* | 11/2011 | Kanai | B06B 1/16 310/81 |

* cited by examiner

VIBRATION GENERATION DEVICE AND ELECTRONIC APPARATUS

RELATED APPLICATIONS

This application claims priority under 35 U.S.C. § 119 to Japanese Patent Application No. 2016-229839 filed on Nov. 28, 2016, the entire content of which is hereby incorporated by reference.

FIELD OF THE INVENTION

The present invention relates to a vibration generation device and an electronic apparatus.

BACKGROUND OF THE INVENTION

In the information equipment such as a cellular phone or a tablet PC, there are used vibrations as measures for transmitting information such as incoming, mail reception, and alarm notification to a user. Further, in recent years, vibrations are used as measures for transmitting a variety of types of information to the user also in a touch panel display or the like used in audio-visual equipment, gaming equipment, and so on.

As the vibration generation device, there is adopted, for example, a vibration motor (see, e.g., JP-A-2016-007114). In general, the vibration motor is provided with a stator, and a rotor having a shaft and a weight. The weight has the gravity center at a position shifted from the central axis of the shaft. In the vibration motor, the rotor rotates to cause the centrifugal action of the weight with the gravity center shifted, and thus, the vibration is generated.

Incidentally, in recent years, there have increased the chances of providing a function of a button to the surfaces of a variety of types of displays in smartphones, on-vehicle devices, and so on. In this case, since it is difficult for the user to judge whether or not the button is pressed (set to the ON state), there is performed to propagate the vibration to the finger in order to notify the user of the fact that the button has been pressed. Further, there have increased the chances of generating vibrations in accordance with a music or a variety of sounds in a smartphone, or transmitting a variety of types of information with vibrations also in a game machine or a virtual reality device. In particular in such purposes, the vibration motor has room for improvement in terms of improving the responsivity in order to promptly transmit the information to the user with the vibration.

Therefore, in view of the circumstances described above, the invention provides a vibration generation device superior in responsivity compared to the related art.

SUMMARY OF THE INVENTION

In order to solve the problem described above, a vibration generation device according to an aspect of the invention includes a stator, a rotor provided to the stator so as to be able to rotate around a predetermined axis, and having a weight having a gravity center at a position shifted from the predetermined axis, and an air resistance reduction part provided to the weight to reduce an air resistance to the weight when the rotor rotates.

According to this configuration, since the weight is provided with the air resistance reduction part for reducing the air resistance to the weight when the rotor rotates, it is possible to reduce the air resistance when the rotor starts rotating to thereby achieve prompt start-up. Therefore, it is possible to realize the vibration generation device superior in responsivity compared to the related art.

Further, since it is possible to reduce the air resistance to the weight when the rotor rotates, the power consumption can be reduced compared to the related art. Further, since it is possible to reduce the air resistance to the weight when the rotor rotates to thereby suppress the wind noise, it is possible to realize the vibration generation device superior in quietness compared to the related art.

Further, the weight is formed to have a semicircular shape viewed from an axial direction, and the air resistance reduction part has an arcuate part adapted to connect an end edge on an upstream side in a rotational direction of the rotor in an outer circumferential surface of the weight and an end edge on a downstream side in the rotational direction to each other so as to form a circular arc shape.

According to this configuration, since the air resistance reduction part connects the outer circumferential surface of the weight so as to form the circular arc shape, it is possible to reduce the air resistance in particular along the outer circumferential surface of the weight. Therefore, it is possible to realize the vibration generation device superior in responsivity compared to the related art.

Further, the air resistance reduction part has a covering part adapted to cover the weight from an outside in the axial direction in the rotor.

According to this configuration, since the air resistance reduction part is provided with the covering part for covering the weight from the outside in the axial direction in the rotor, it is possible to achieve reduction of the air resistance along the end surface in the axial direction of the weight in addition to the reduction of the air resistance along the outer circumferential surface of the weight. Therefore, it is possible to realize the vibration generation device superior in responsivity compared to the related art.

Further, the covering part and the weight are fixed to each other with a locking part.

According to this configuration, it is possible to make the air resistance reduction part capable of being easily attached and detached to the weight with a simple configuration.

Further, the rotor is formed to have a disk-like shape, the weight is formed to have a circular arc shape along an outer circumferential surface of the rotor viewed from an axial direction of the rotor, and an end surface on a downstream side in a rotational direction of the rotor of the weight has a tilted surface tilted from an upstream side toward the downstream side in the rotational direction, and from an inner side in a radial direction toward an outer side in the radial direction of the rotor.

According to this configuration, since the weight is formed to have a circular arc shape along the outer circumferential surface of the rotor, and the end surface on the downstream side in the rotational direction has a tilted surface tilted from the upstream side toward the downstream side in the rotational direction and from the inner side in the radial direction toward the outer side in the radial direction of the rotor, the air can smoothly flow along the outer circumferential surface of the weight and the tilted surface due to the rotation of the rotor. Therefore, it is possible to realize the vibration generation device superior in responsivity compared to the related art. Further, it is possible to realize the vibration generation device capable of reducing the power consumption and superior in quietness compared to the related art.

Further, viewed from the axial direction, a tip on the downstream side of the weight is located on the downstream side of an imaginary line along the radial direction.

According to this configuration, since the tip on the downstream side of the weight is located on the downstream side of the imaginary line along the radial direction, it is possible to exert centrifugal force equivalent to that of the weight not provided with the tilted surface at the tip thereof. Therefore, it is possible to realize the vibration generation device capable of providing a desired vibration.

Further, an end surface on the upstream side of the weight forms a plane along the imaginary line.

According to this configuration, since the end surface on the upstream side of the weight forms the plane along the imaginary line, it is possible to provide the air resistance to easily stop the rotor when the rotor makes reverse rotation. Therefore, it is possible to realize the vibration generation device provided with a variety of functions such as quick start in the normal rotation, and quick stop in the reverse rotation.

Further, viewed from the axial direction, the tilted surface is disposed so as to cross the imaginary line.

According to this configuration, since the tilted surface at the tip of the weight is disposed so as to cross the imaginary line, it is possible to exert centrifugal force equivalent to that of the weight not provided with the tilted surface at the tip thereof. Therefore, it is possible to realize the vibration generation device capable of providing a desired vibration.

Further, defining a distance from an intersection point between the tilted surface and the imaginary line to an outer side edge part in the radial direction of the tilted surface as L1, and a distance from the intersection point between the tilted surface and the imaginary line to an inner side edge part in the radial direction of the tilted surface as L2, the air resistance reduction part is formed to fulfill L1<L2.

According to this configuration, since the air resistance reduction part is formed so as to fulfill L1<L2 defining the distance from the intersection point between the tilted surface and the imaginary line to the outer side edge part of the tilted surface as L1, and the distance from the intersection point between the tilted surface and the imaginary line to the inner side edge part of the tilted surface as L2, the tilted surface is forming considering the balance between the centrifugal force acting on the inner side in the radial direction of the intersection point between the tilted surface and the imaginary line, and the centrifugal force acting on the outer side in the radial direction of the intersection point between the tilted surface and the imaginary line. Therefore, it is possible to realize the vibration generation device capable of providing a desired vibration.

Further, an electronic apparatus according to another aspect of the invention is equipped with the vibration generation device described above.

According to this configuration, it is possible to realize the electronic apparatus superior in responsivity when transmitting the information to the user with the vibration compared to the related art. Further, it is possible to realize the electronic apparatus capable of reducing the power consumption compared to the related art. Further, it is possible to realize the electronic apparatus superior in quietness when transmitting the information to the user with the vibration compared to the related art.

According to the invention, since the rotor is provided with the air resistance reduction part for reducing the air resistance when the rotor rotates, it is possible to reduce the air resistance when the rotor starts rotating to thereby achieve prompt start-up. Therefore, it is possible to realize the vibration generation device superior in responsivity compared to the related art.

Further, since it is possible to reduce the air resistance when the rotor rotates, the power consumption can be reduced compared to the related art. Further, since it is possible to reduce the air resistance when the rotor rotates to thereby suppress the wind noise, it is possible to realize the vibration generation device superior in quietness compared to the related art.

DETAILED DESCRIPTION OF THE INVENTION

Some embodiments of the invention will hereinafter be described with reference to the accompanying drawings.

Figure 1:
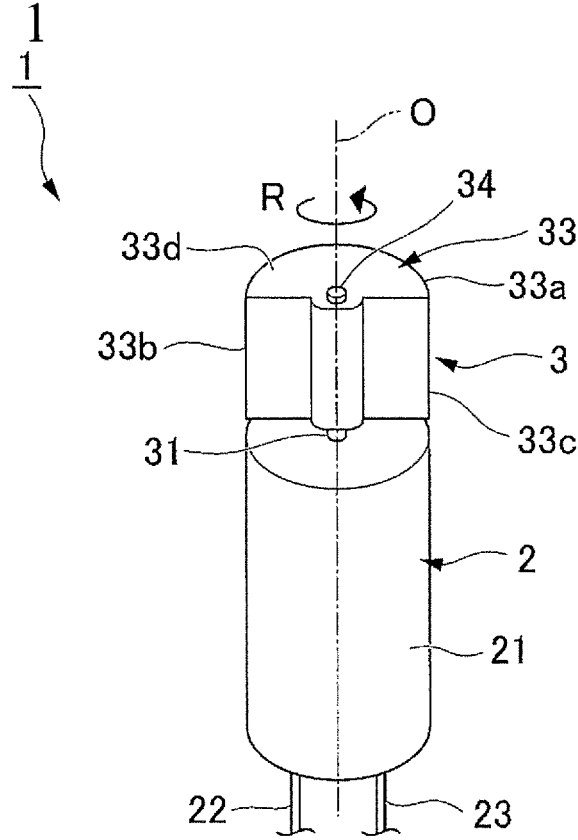
FIG. 1 is a perspective view of a vibration motor according to a first embodiment, and is an explanatory diagram showing a state before attaching an air resistance reduction part.

FIG. 1 is a perspective view of a vibration motor according to a first embodiment, and is an explanatory diagram showing a state before attaching an air resistance reduction part.

As shown in FIG. 1, a vibration motor 1 (corresponding to a "vibration generation device" in the appended claims) according to the present embodiment is used while being incorporated in an electronic apparatus such as information equipment such as a cellular phone or a tablet PC.

The vibration motor 1 is, for example, a brushed DC motor having a cylindrical shape, and is provided with a stator 2, and a rotor 3 rotatably provided to the stator 2.

The stator 2 has a stator housing 21 having a cylindrical shape. Inside the stator housing 21, there are disposed a magnet not shown, a commutator, and brushes. From the stator 2, there extend a pair of lead wires 22, 23 for positive and negative terminals for supplying the electrical power.

The rotor 3 has a coil not shown, a coil holder not shown the coil is wound around, a shaft 31 attached to the coil holder, and a weight 33. The coil and the coil holder are disposed inside the stator housing 21.

A first end of the shaft 31 is disposed inside the stator housing 21, and a second end thereof projects outside the stator housing 21. To the first end of the shaft 31, there is fixed the coil holder.

To the second end of the shaft 31, there is fixed the weight 33. The weight 33 is formed to have a semicircular shape viewed from the axial direction of the rotor 3, and has the gravity center located eccentrically in the radial direction with respect to the central axis O (corresponding to a "predetermined axis" in the appended claims) of the shaft 31.

At the position corresponding to the central axis O in the weight 33, there is disposed a locking part 34 projecting in the axial direction. The locking part 34 is fitted in a fitting hole 14 of an air resistance reduction part 10 described later to be locked.

The vibration motor 1 is capable of generating a vibration due to the excitation force caused by the imbalance of the gravity center of the weight 33 when the rotor 3 rotates.

In the case of operating the vibration motor 1 configured as described above, a current is supplied to the coil through the lead wires 22, 23 and the brushes. Then, due to the mutual action between the magnetic force generated in the coil and the magnetic force of the magnet, the coil, the coil holder and the shaft 31 rotate together in the direction of the arrow R (the counterclockwise direction viewed from the weight 33 side in the axial direction) around the central axis O. As a result, it is possible to generate the vibration by rotating the weight 33 around the central axis O.

Figure 2:
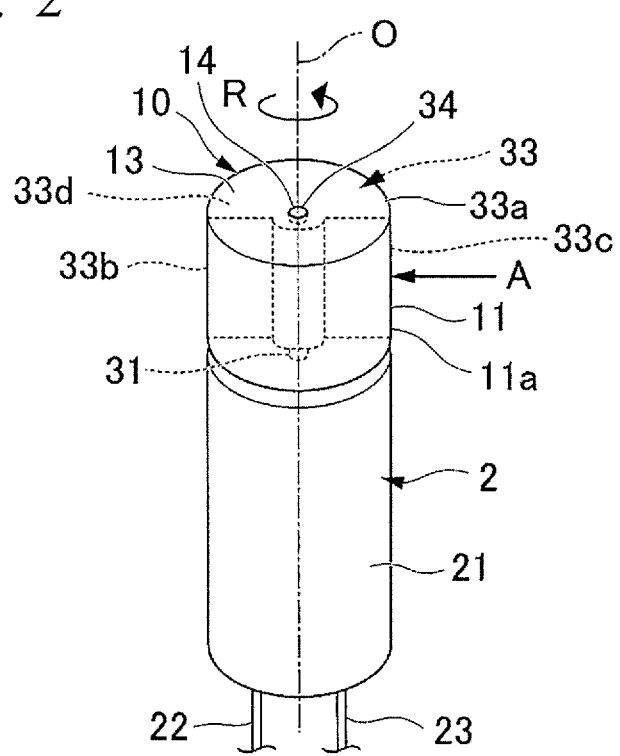
FIG. 2 is a perspective view of the vibration motor according to the first embodiment, and is an explanatory diagram showing a state when the air resistance reduction part is attached.
Figure 3:
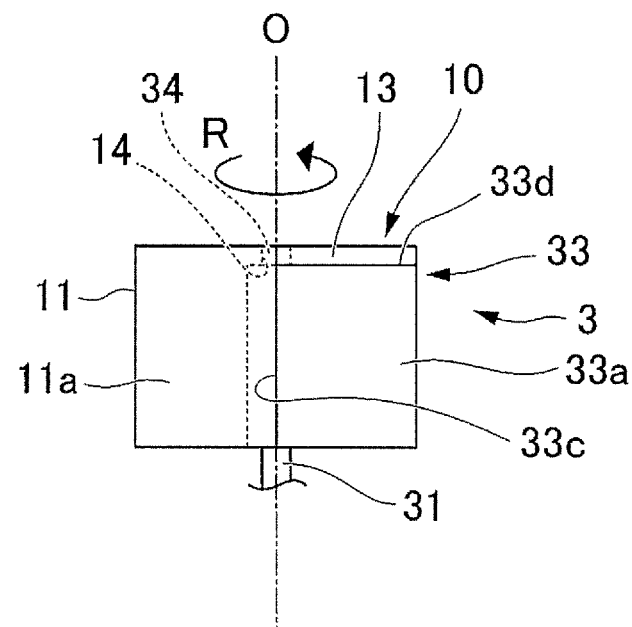
FIG. 3 is a diagram viewed along the arrow A shown in FIG. 2.

FIG. 2 is a perspective view of the vibration motor according to the first embodiment, and is an explanatory diagram showing a state when the air resistance reduction part is attached. FIG. 3 is a diagram viewed along the arrow A shown in FIG. 2.

Here, as shown in FIG. 2 and FIG. 3, the vibration motor 1 according to the present embodiment is provided with the air resistance reduction part 10. The air resistance reduction part 10 is provided to the weight 33, and reduces the air resistance to the weight 33 when the rotor 3 rotates.

The air resistance reduction part 10 is formed of, for example, a resin material, and has an arcuate part 11 and a covering part 13.

The arcuate part 11 connects an end edge 33b on the upstream side in the rotational direction (the direction of the arrow R) of the rotor 3 in an outer circumferential surface 33a of the weight 33 formed to have the semicircular shape and an end edge 33c on the downstream side in the rotational direction (the direction of the arrow R) to each other so as to form a circular arc shape. The curvature radius of an outer circumferential surface 11a of the arcuate part 11 is made roughly the same as the curvature radius of the outer circumferential surface 33a of the weight 33. The arcuate part 11 is disposed in the state of having contact with the end edge 33b on the upstream side and the end edge 33c on the downstream side. Thus, since the outer circumferential surface 33a of the weight 33 and the arcuate part 11 are continuously connected to each other, the air can smoothly flow along the outer circumferential surface 33a of the weight 33 and the outer circumferential surface 11a of the arcuate part 11 due to the rotation of the rotor 3.

The covering part 13 has a disk-like shape, and is formed integrally with the arcuate part 11. At the center of the covering part 13, there is formed the fitting hole 14. The locking part 34 of the weight 33 is pressed into the fitting hole 14. Thus, the air resistance reduction part 10 is fixed to the weight 33 in the state in which the covering part 13 covers an outer end surface 33d of the weight 33 from the outside in the axial direction in the rotor 3.

Incidentally, although the structure in which the locking part 34 is pressed into the fitting hole 14 is shown hereinabove, it is also possible to fit the locking part 34 into the fitting hole 14, and then fix the covering part 13 and the weight 33 to each other with bonding, welding, or the like.

Figure 4:
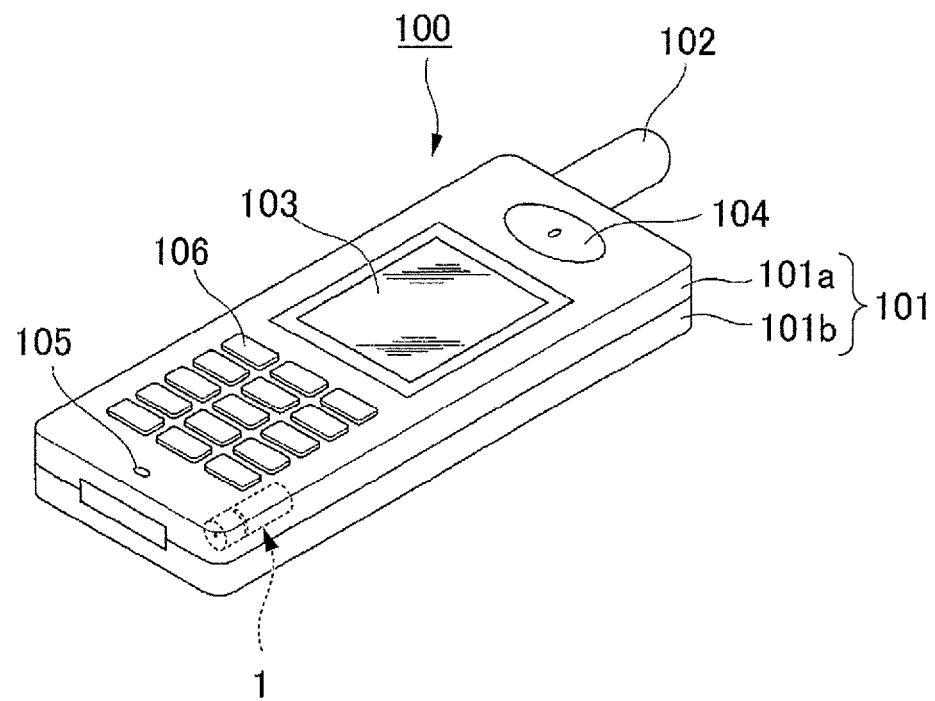
FIG. 4 is a perspective view of a cellular phone equipped with the vibration motor according to the first embodiment.

FIG. 4 is a perspective view of a cellular phone equipped with the vibration motor according to the first embodiment described above.

As shown in FIG. 4, a cellular phone 100 is an example of an electronic apparatus using the vibration motor 1 according to the first embodiment described above. The cellular phone 100 is provided with a housing 101 having a roughly rectangular parallelepiped shape formed of an upper case 101a and a lower case 101b combined with each other, and an antenna 102 disposed so as to project on a side surface in the longitudinal direction of the housing 101.

The upper case 101a of the housing 101 is provided with an ear piece part 104, a display part 103, a plurality of buttons 106, and a mouthpiece part 105. The lower case 101b is provided with a power supply not shown formed of a rechargeable battery.

Inside the housing 101, there is disposed the vibration motor 1. The vibration motor 1 is mounted on a circuit board not shown having a control section in, for example, the lower case 101b. The vibration motor 1 rotates due to the electrical power supplied from the rechargeable battery based on a signal from the control section. Thus, it is possible for the cellular phone 100 to transmit the information such as incoming, mail reception, and alarm notification, and the confirmation when touching the panel with a finger to the user as the vibration of the vibration motor 1.

According to the first embodiment, since the weight 33 is provided with the air resistance reduction part 10 for reducing the air resistance to the weight 33 when the rotor 3 rotates, it is possible to reduce the air resistance when the rotor 3 starts rotating to thereby achieve prompt start-up. Therefore, it is possible to realize the vibration motor 1 superior in responsivity compared to the related art.

Further, since it is possible to reduce the air resistance to the weight 33 when the rotor 3 rotates, the power consumption can be reduced compared to the related art. Further, since it is possible to reduce the air resistance to the weight 33 when the rotor 3 rotates to thereby suppress the wind noise, it is possible to realize the vibration motor 1 superior in quietness compared to the related art.

Further, since the air resistance reduction part 10 connects the outer circumferential surface 33a of the weight 33 so as to form the circular arc shape, it is possible to reduce the air resistance in particular along the outer circumferential surface 33a of the weight 33. Therefore, it is possible to realize the vibration motor 1 superior in responsivity compared to the related art.

Further, since the air resistance reduction part 10 is provided with the covering part 13 for covering the weight 33 from the outside in the axial direction in the rotor 3, it is possible to achieve reduction of the air resistance along the outer end surface 33d in the axial direction of the weight 33 in addition to the reduction of the air resistance along the outer circumferential surface 33a of the weight 33. Therefore, it is possible to realize the vibration motor 1 superior in responsivity compared to the related art.

Further, since the covering part 13 and the weight 33 are fixed to each other by pressing the locking part 34 into the fitting hole 14 of the covering part 13, it is possible to make the air resistance reduction part 10 capable of being easily attached and detached to the weight 33 with the simple configuration.

Further, since the cellular phone 100 is provided with the vibration motor described above, it is possible to realize the cellular phone 100 superior in responsivity when transmitting the information to the user with the vibration compared to the related art. Further, it is possible to realize the cellular phone 100 capable of reducing the power consumption compared to the related art. Further, it is possible to realize the cellular phone 100 superior in quietness when transmitting the information to the user with the vibration compared to the related art.

Second Embodiment

Figure 5:
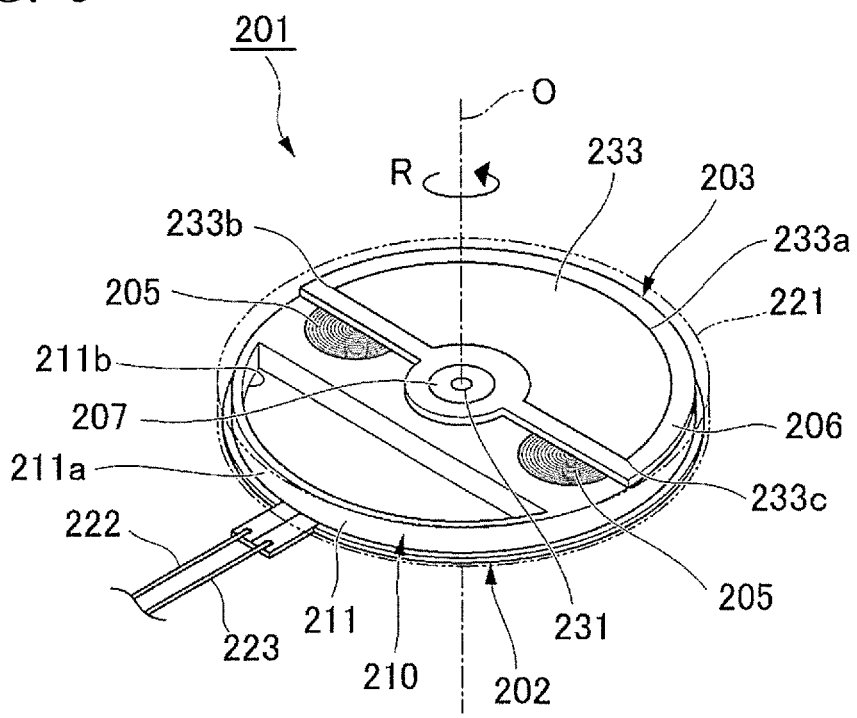
FIG. 5 is a perspective view of a vibration motor according to a second embodiment.

FIG. 5 is a perspective view of a vibration motor according to a second embodiment.

The application of the invention is not limited to the so-called cylindrical motor according to the first embodiment described above, but the invention can be applied to a variety of types of motors.

As shown in FIG. 5, a vibration motor 201 according to the second embodiment is a so-called coin-type brushed DC motor, and is provided with a stator 202, and a rotor 203 rotatably provided to the stator 202.

The stator 202 is formed to have a disk-like shape, and is provided with a magnet not shown, a commutator, and brushes. From the stator 202, there extend a pair of lead wires 222, 223 for positive and negative terminals for supplying the electrical power. Further, from the stator 202, there is erected a shaft 231. The shaft 231 is inserted in a bearing 207 of the rotor 203. Thus, the rotor 203 is made rotatable around the central axis O.

The rotor 203 has a pair of coils 205, 205, a substrate not shown on which the pair of coils 205, 205 are wound, and a weight 233. The pair of coils 205, 205, the substrate, and the weight 233 are integrally fixed using a molded part 206 formed of, for example, a resin material.

The weight 233 is formed to have a semicircular shape viewed from the axial direction of the rotor 203, and has the gravity center located eccentrically in the radial direction with respect to the central axis O of the shaft 231.

The stator 202 and the rotor 203 configured as described above are covered by a housing 221. It should be noted that in FIG. 5, the housing 221 is shown with imaginary lines.

Figure 6:
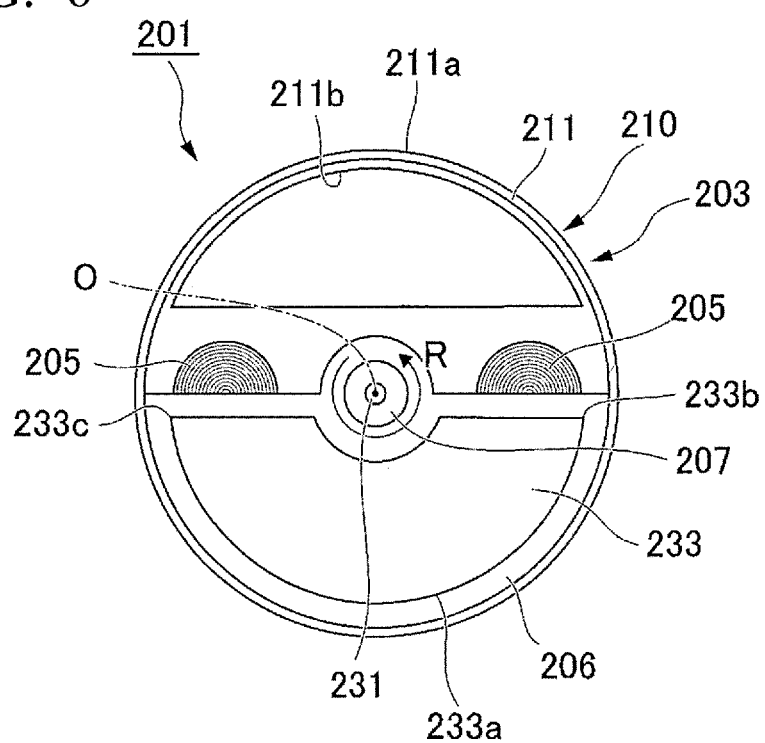
FIG. 6 is a plan view of an air resistance reduction part of the second embodiment.

FIG. 6 is a plan view of an air resistance reduction part of the second embodiment.

As shown in FIG. 6, the air resistance reduction part 210 is formed of, for example, a resin material, and has an arcuate part 211.

The arcuate part 211 connects an end edge 233b on the upstream side in the rotational direction (the direction of the arrow R) of the rotor 203 in an outer circumferential surface 233a of the weight 233 formed to have the semicircular shape and an end edge 233c on the downstream side in the rotational direction (the direction of the arrow R) to each other so as to form a circular arc shape. The arcuate part 211 is formed integrally with the molded part 206.

The region located on the inner side in the radial direction of the arcuate part 211, and between the arcuate part 211 and the molded part 206 forms a through hole 211b penetrating in the axial direction. Thus, it becomes possible to reduce the weight of the rotor 203, and therefore, the power consumption can be reduced. Further, the curvature radius of the outer circumferential surface 211a of the arcuate part 211 is made roughly the same as the curvature radius of the outer circumferential surface of the molded part 206. Thus, since the outer circumferential surface of the molded part 206 and the arcuate part 211 are continuously connected to each other, the air can smoothly flow along the outer circumferential surface of the molded part 206 and an outer circumferential surface 211a of the arcuate part 211 due to the rotation of the rotor 203.

It should be noted that the region located on the inner side in the radial direction of the arcuate part 211 and between the arcuate part 211 and the molded part 206 is not limited to the form of the through hole 211b, but can also be provided with a bottom part, or filled with, for example, a resin material.

According to the second embodiment, even in the case of applying the invention to the coin-type brushed DC motor, substantially the same functions and advantages as in the first embodiment can be obtained. Specifically, since the weight 233 is provided with an air resistance reduction part 210 for reducing the air resistance to the weight 233 when the rotor 203 rotates, it is possible to reduce the air resistance when the rotor 203 starts rotating to thereby achieve prompt start-up. Therefore, it is possible to realize the vibration motor 201 superior in responsivity compared to the related art.

Further, since it is possible to reduce the air resistance to the weight 233 when the rotor 203 rotates, the power consumption can be reduced compared to the related art. Further, since it is possible to reduce the air resistance to the weight 233 when the rotor 203 rotates to thereby suppress the wind noise, it is possible to realize the vibration motor 201 superior in quietness compared to the related art.

Third Embodiment

Figure 7:
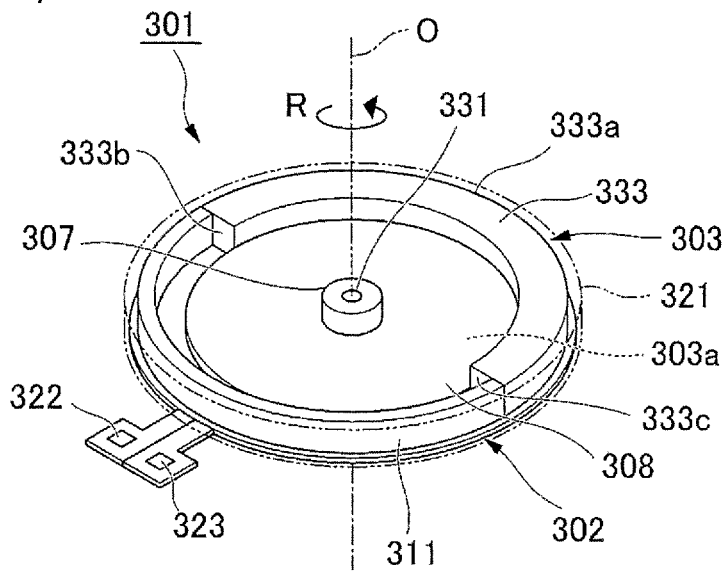
FIG. 7 is a perspective view of a vibration motor according to a third embodiment.

FIG. 7 is a perspective view of a vibration motor according to a third embodiment.

A vibration motor 301 according to the third embodiment is a so-called coin-type brushless DC motor, and is provided with a stator 302, and a rotor 303 rotatably provided to the stator 302.

The stator 302 is formed to have a disk-like shape, and is provided with a pair of coils not shown, and a position detection sensor not shown. From the stator 302, there extend a pair of terminal parts 322, 323 for supplying the electrical power. A shaft 331 is inserted in a bearing 307 of the rotor 303. Further, from the stator 302, there is erected the shaft 331. The position detection sensor is a magnetic sensor such as a hall element, and detects the position of the rotor 303 described later.

Figure 8:
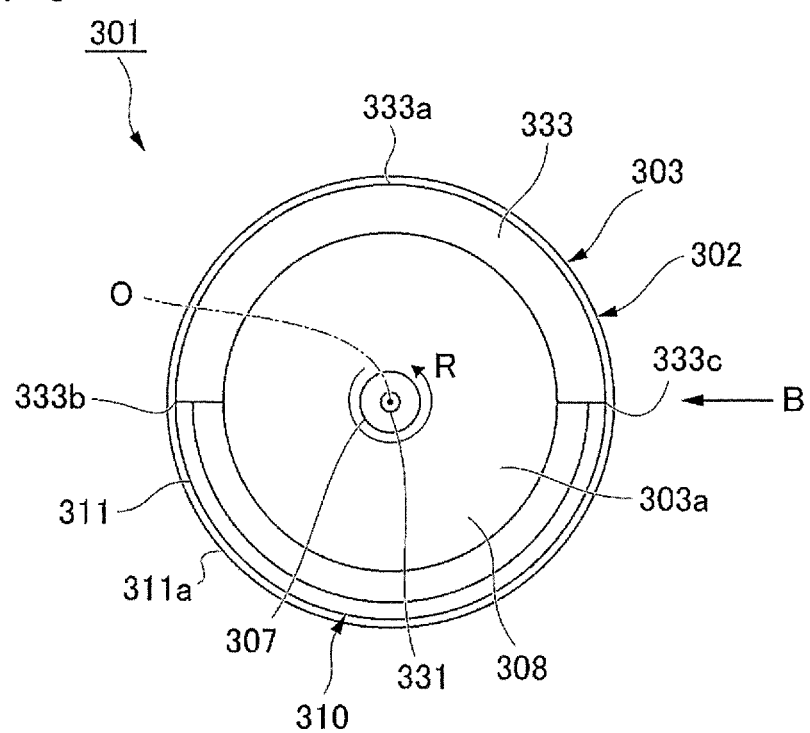
FIG. 8 is a plan view of an air resistance reduction part of the third embodiment.

FIG. 8 is a plan view of an air resistance reduction part of the third embodiment.

The rotor 303 has a yoke 303a having a disk-like shape, a magnet 308 having a ring-like shape, and a weight 333. The yoke 303a and the magnet 308 are disposed so as to be stacked on one another in the axial direction. The weight 333 is formed to have a semicircular arc shape viewed from the axial direction of the rotor 303, and has the gravity center located eccentrically in the radial direction with respect to the central axis O of the shaft 331. The weight 333 is disposed on the outer side in the radial direction of the magnet 308, and is fixed to the yoke 303a with, for example, an adhesive or welding.

Figure 9:
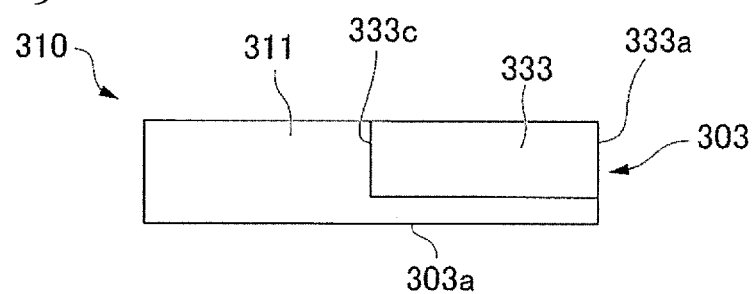
FIG. 9 is a diagram viewed along the arrow B shown in FIG. 8.

FIG. 9 is a diagram viewed along the arrow B shown in FIG. 8.

As shown in FIG. 8 and FIG. 9, an air resistance reduction part 310 is formed of, for example, a metal material, and has an arcuate part 311.

The arcuate part 311 connects an end edge 333b on the upstream side in the rotational direction (the direction of the arrow R) of the rotor 303 in an outer circumferential surface 333a of the weight 333 formed to have the semicircular arc shape and an end edge 333c on the downstream side in the rotational direction (the direction of the arrow R) to each other so as to form a circular arc shape. The arcuate part 311 and the yoke 303a are formed integrally with each other using press working such as drawing.

The stator 302 and the rotor 303 configured as described above are covered by a housing 321. It should be noted that in FIG. 8, the housing 321 is shown with imaginary lines.

Figure 10:
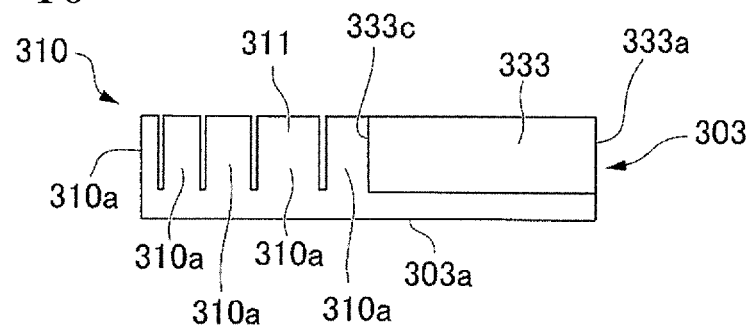
FIG. 10 is a side view of an air resistance reduction part according to a modified example of the third embodiment.

FIG. 10 is a side view of an air resistance reduction part according to a modified example of the third embodiment.

It should be noted that the shape of the air resistance reduction part 310 is not limited to the form described above. For example, as shown in FIG. 10, the air resistance reduction part 310 can be formed by providing cutouts to an edge part of a plate member, which is formed to have a semicircular shape, to thereby form a plurality of extending pieces 310a, and then bending the extending pieces 310a toward the axial direction to erect the extending pieces 310a.

According to the third embodiment, substantially the same functions and advantages as in the first embodiment and the second embodiment described above can be obtained. Specifically, since the weight 333 is provided with the air resistance reduction part 310 for reducing the air resistance to the weight 333 when the rotor 303 rotates, it is possible to reduce the air resistance when the rotor 303 starts rotating to thereby achieve prompt start-up. Therefore, it is possible to realize the vibration motor 301 superior in responsivity compared to the related art.

Further, since it is possible to reduce the air resistance to the weight 333 when the rotor 303 rotates, the power consumption can be reduced compared to the related art. Further, since it is possible to reduce the air resistance to the weight 333 when the rotor 303 rotates to thereby suppress the wind noise, it is possible to realize the vibration motor 301 superior in quietness compared to the related art.

Fourth Embodiment

Figure 11:
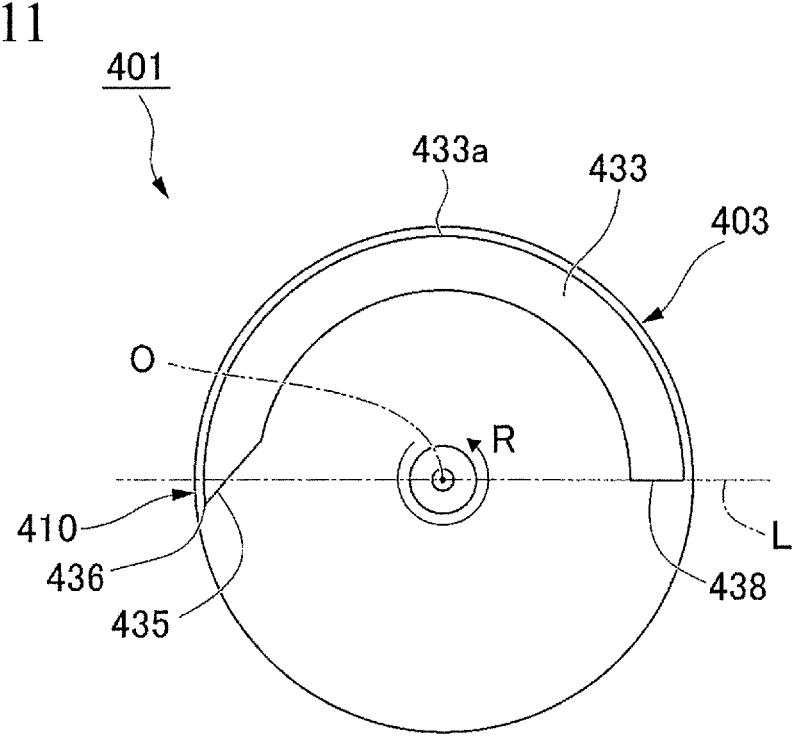
FIG. 11 is a plan view of an air resistance reduction part of a fourth embodiment.

FIG. 11 is a plan view of an air resistance reduction part of the fourth embodiment.

Subsequently, the air resistance reduction part of the fourth embodiment will be described.

The air resistance reduction part 310 of the third embodiment described above is provided with the arcuate part 311 (see FIG. 8). In contrast, as shown in FIG. 11, the fourth embodiment is different from the third embodiment in the point that an air resistance reduction part 410 is formed of a tilted surface 435 provided to an end surface of a weight 433. It should be noted that regarding parts having substantially the same configuration as in the third embodiment, the detailed description will hereinafter be omitted.

As shown in FIG. 11, the weight 433 is formed to have a circular arc shape along the outer circumferential surface of a rotor 403 viewed from the axial direction of the rotor 403.

The end surface on the downstream side in the rotational direction (the direction of the arrow R) of the rotor 403 of the weight 433 forms the tilted surface 435 tilted from the upstream side toward the downstream side in the rotational direction, and from the inner side in the radial direction toward the outer side in the radial direction of the rotor 403.

Here, viewed from the axial direction, defining a straight line passing along the radial direction through the central axis O as an imaginary line L, the tilted surface 435 is disposed so as to cross the imaginary line L. Further, a tip 436 on the downstream side in the rotational direction of the weight 433 is located on the downstream side in the rotational direction of the imaginary line L passing along the radial direction through the central axis O viewed from the axial direction.

Further, an end surface 438 on the upstream side in the rotational direction of the weight 433 forms a plane along the imaginary line L.

Figure 12:
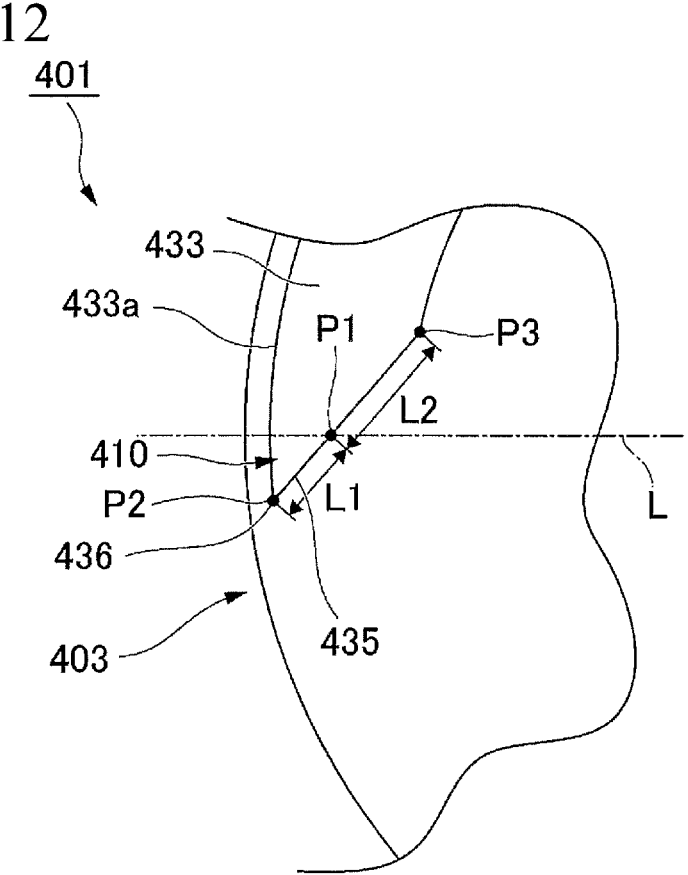
FIG. 12 is an enlarged view of the air resistance reduction part of the fourth embodiment.

FIG. 12 is an enlarged view of the air resistance reduction part of the fourth embodiment.

As shown in FIG. 12, defining the distance from an intersection point P1 between the tilted surface 435 and the imaginary line L to the outer side edge part P2 in the radial direction of the tilted surface 435 as L1, and the distance from the intersection point P1 between the tilted surface 435 and the imaginary line L to the inner side edge part P3 in the radial direction of the tilted surface 435 as L2, the air resistance reduction part 410 is formed to fulfill the following.

$$L1 < L2 \qquad (1)$$

According to the fourth embodiment, the air can flow smoothly along an outer circumferential surface 433a of the weight 433 and the tilted surface 435 due to the rotation of the rotor 403. Therefore, it is possible to realize a vibration motor 401 superior in responsivity compared to the related art. Further, it is possible to realize the vibration motor 401 capable of reducing the power consumption and superior in quietness compared to the related art.

Further, since the tip 436 on the downstream side of the weight 433 is located on the downstream side of the imaginary line L along the radial direction, it is possible to exert centrifugal force equivalent to that of the weight not provided with the tilted surface at the tip thereof. Therefore, it is possible to realize the vibration motor 401 capable of providing a desired vibration.

Further, since the end surface 438 on the upstream side of the weight 433 forms the plane along the imaginary line L, it is possible to provide the air resistance to easily stop the rotor 403 when the rotor 403 makes reverse rotation. Therefore, it is possible to realize the vibration motor 401 provided with a variety of functions such as quick start in the normal rotation, and quick stop in the reverse rotation.

Further, since the tilted surface 435 at the tip 436 of the weight 433 is disposed so as to cross the imaginary line L, it is possible to exert centrifugal force equivalent to that of the weight not provided with the tilted surface at the tip thereof. Therefore, it is possible to realize the vibration motor 401 capable of providing a desired vibration.

Further, since the air resistance reduction part 410 is formed so as to fulfill the formula (1), the tilted surface 435 is formed considering the balance between the centrifugal force acting on the inner side in the radial direction of the intersection point P1 between the tilted surface 435 and the imaginary line L, and the centrifugal force acting on the outer side in the radial direction of the intersection point P1 between the tilted surface 435 and the imaginary line L. Therefore, it is possible to realize the vibration motor 401 capable of providing a desired vibration.

It should be noted that the invention is not limited to the embodiments described above, but includes those obtained by providing a variety of modifications to the embodiments described above within the scope of the spirit of the invention.

In the first embodiment, the description is presented taking the cellular phone 100 as an example of the electronic apparatus equipped with the vibration motor 1, but the invention is not limited to this example. As the electronic apparatus equipped with the vibration motor 1, there can be cited information equipment such as a tablet PC, a touch panel display of audio-visual equipment, a touch panel display of gaming equipment, a touch panel display of a vehicle, and a part mounted on a human body in a virtual-reality apparatus.

In the fourth embodiment, the end surface on the downstream side in the rotational direction (the direction of the arrow R) of the rotor 403 of the weight 433 forms the tilted surface 435 tilted from the upstream side toward the downstream side in the rotational direction, and from the inner side in the radial direction toward the outer side in the radial direction of the rotor 403. In contrast, it is also possible for the end part on the downstream side of the weight 433 to have a peaked shape viewed from the axial direction by further providing a tilted surface, which is tilted from the upstream side toward the downstream side in the rotational direction, and from the outer side in the radial direction toward the inner side in the radial direction of the rotor 403, to the outer side in the radial direction in the end surface on the downstream side in the rotational direction (the direction of the arrow R) of the rotor 403 of the weight 433 in addition to the tilted surface 435.

The tilted surface 435 of the weight 433 is disposed so as to cross the imaginary line L viewed from the axial direction in the fourth embodiment, but is not required to cross the imaginary line L.

Further, the tip 436 on the downstream side in the rotational direction of the weight 433 is located on the downstream side in the rotational direction of the imaginary line L viewed from the axial direction, but can also be located on the upstream side in the rotational direction of the imaginary line L.

The manufacturing methods, the materials, and so on of the air resistance reduction parts 10, 210, 310, 410 in the respective embodiments are not limited to the respective embodiments. Therefore, for example, the air resistance reduction part 10 of the first embodiment can also be formed of a metal material.

Besides the above, it is arbitrarily possible to replace the constituent in the embodiments described above with a known constituent within the scope of the spirit of the invention.

What is claimed is:

1. A vibration generation device comprising:
   a stator;
   a rotor provided to the stator so as to be able to rotate around a predetermined axis, and having a weight having a gravity center at a position shifted from the predetermined axis, the weight having an outer circumferential surface including an upstream outer peripheral end edge in a rotational direction of the rotor and a downstream outer peripheral end edge in the rotational direction; and
   an air resistance reduction part coupled to the weight to reduce an air resistance to the weight when the rotor rotates, wherein the air resistance reduction part has an arcuate part with an outer circumferential surface having a downstream outer peripheral end edge in the rotational direction and an upstream outer peripheral edge in the rotational direction, wherein at least a portion of the downstream outer peripheral end edge of the arcuate part contacts at least a portion of the upstream outer peripheral end edge of the weight in the rotational direction, and wherein at least a portion of the upstream outer peripheral end edge of the arcuate part contacts at least a portion of the downstream outer peripheral end edge of the weight in the rotational direction so that the outer circumferential surface of the weight and the outer circumferential surface of the air resistance reduction part together form a circular arc shape at a location where the downstream outer peripheral end edge of the arcuate part contacts the upstream outer peripheral end edge of the weight, and at a location where the upstream outer peripheral end edge of the arcuate part contacts the downstream outer peripheral end edge of the weight.

2. The vibration generation device according to claim 1, wherein the weight is formed to have a semicircular shape viewed from an axial direction.

3. The vibration generation device according to claim 1, wherein
   the air resistance reduction part has a covering part adapted to cover the weight from an outside in the axial direction in the rotor.

4. The vibration generation device according to claim 3, wherein
   the covering part and the weight are fixed to each other with a locking part.

5. An electronic apparatus comprising:
   the vibration generation device according to claim 1.

6. The vibration generation device according to claim 1, wherein
   a curvature radius of the outer circumferential surface of the arcuate part is made roughly the same as a curvature radius of the outer circumferential surface of the weight.

7. A vibration generation device comprising:
   a stator;
   a rotor provided to the stator so as to be able to rotate around a predetermined axis, and having a weight having a gravity center at a position shifted from the predetermined axis, wherein
   the rotor is formed to have a disk-like shape, and
   the weight is formed to have a circular arc shape along an outer circumferential surface of the rotor viewed from the axial direction of the rotor; and
   an air resistance reduction part provided to the weight to reduce an air resistance to the weight when the rotor rotates, wherein an end surface on a downstream side in a rotational direction of the rotor of the weight has a tilted surface tilted in comparison to an imaginary line which extends from the predetermined axis toward the end surface on the downstream side in a rotational direction of the rotor along a radial direction, the tilted surface having a start point at an inner side in the radial direction and an end point at an outer side in the radial direction of the rotor, and, from the start point to the end point, the tilted surface tilts from an upstream side toward the downstream side in the rotational direction.

8. The vibration generation device according to claim 7, wherein
   viewed from the axial direction, a tip on the downstream side of the weight is located on the downstream side of the imaginary line along the radial direction.

9. The vibration generation device according to claim 8, wherein
   an end surface on the upstream side of the weight forms a plane along the imaginary line.

10. The vibration generation device according to claim 8, wherein
viewed from the axial direction, the tilted surface is disposed so as to cross the imaginary line.

11. The vibration generation device according to claim 10, wherein
defining a distance from an intersection point between the tilted surface and the imaginary line to an outer side edge part in the radial direction of the tilted surface as L1, and a distance from the intersection point between the tilted surface and the imaginary line to an inner side edge part in the radial direction of the tilted surface as L2, the air resistance reduction part is formed to fulfill the following:

$$L1<L2.$$

12. The vibration generation device according to claim 8, wherein
the imaginary line also extends from the predetermined axis toward the end surface on the upstream side in the rotational direction of the rotor along the radial direction.

13. An electronic apparatus comprising:
the vibration generation device according to claim 7.

* * * * *